Patented June 6, 1939

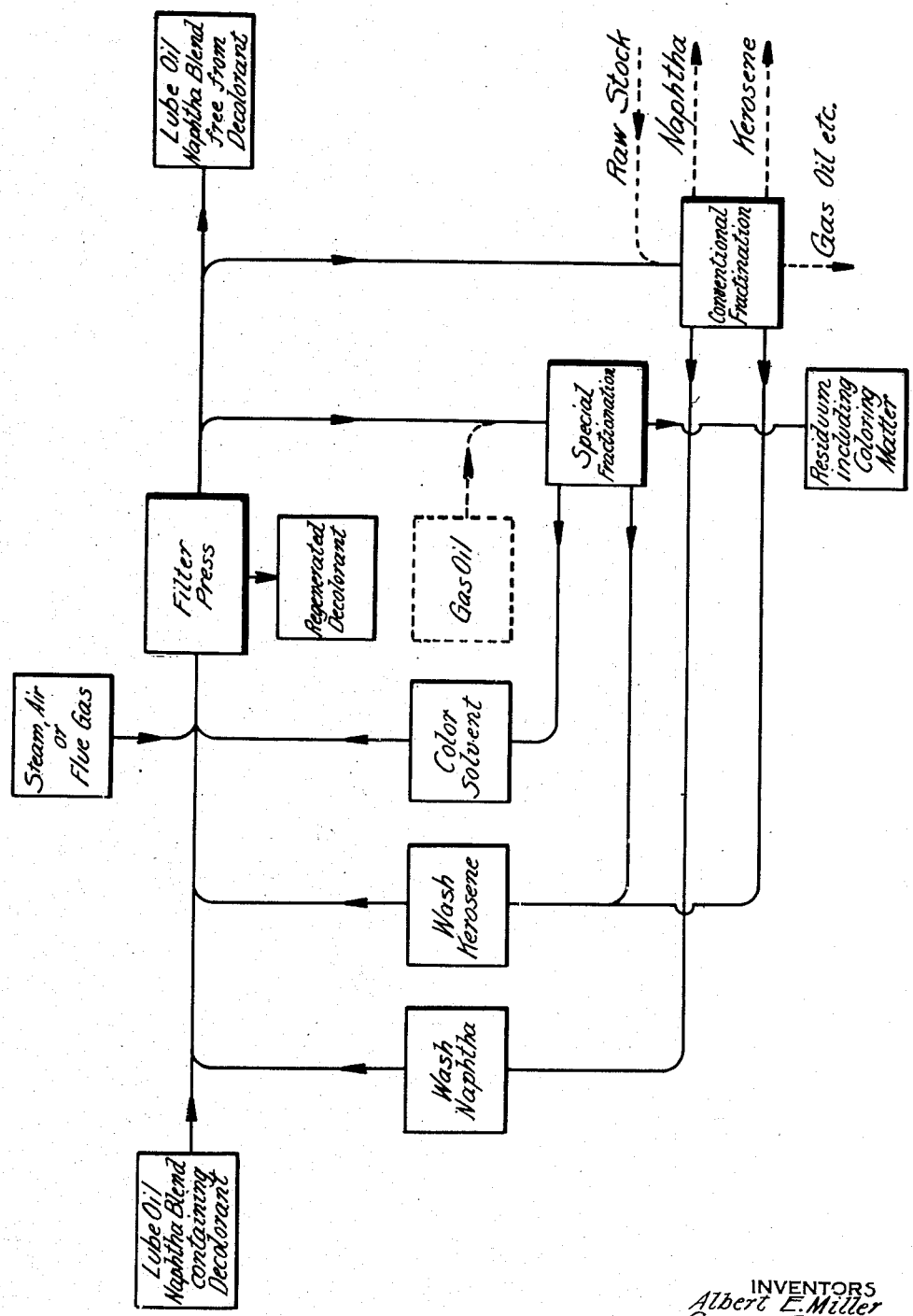

2,161,306

UNITED STATES PATENT OFFICE 2,161,306

SOLVENT REGENERATION OF SPENT DECOLORIZING ADSORBENT

Albert E. Miller, Westfield, N. J., and George R. Lord, Pelham Manor, N. Y., assignors to Sinclair Refining Company, New York, N. Y., a corporation of Maine Application January 4, 1938, Serial No. 183,340

6 Claims. (Cl. 252—2)

This invention relates to improvements in the processing of petroleum lubricating oils, and more particularly to improvements in the solvent regeneration of solid decolorizing agents, clays, treated clays and the like, used in such processing.

It is common practice, in the processing of petroleum lubricating oils, to decolorize the oil, usually after other processing, by maintaining a mixture of the oil and a solid decolorizing agent at an elevated temperature for an appropriate period of time and thereafter to separate the decolorizing agent contaminated with adsorbed coloring matter from the oil in a filter. To facilitate the operation, the lubricating oil, if very viscous, is usually diluted with some lower boiling and less viscous oil prior to the filtering step. The more effective solid decolorizing agents, acid treated clays for example, are too costly to be discarded after each such operation and must therefore be regenerated for re-use.

One general method of regeneration is to extract contaminating coloring matter from the decolorizing agent with a color solvent. Following such extraction the decolorizing agent must be freed from retained color solvent and the color solvent must be recovered for reuse. The color solvents generally used, and those more particularly involved in this invention, are of relatively low boiling range. These color solvents, moreover, are commonly used in the form of composite solvent mixtures including correspondingly low boiling hydrocarbon distillates. The coloring matter originally contaminating the lubricating oils processed is of boiling range within that of the fraction constituting the lubricating oil, and therefore is not to be removed from the lubricating oil by distillation. The decolorizing agent effects this removal by selective adsorption. Thus, in over-all operations including solvent regeneration of the decolorizing agent, the objectionable coloring matter is separated from the petroleum lubricating oil by adsorption, from the decolorizing agent effecting this adsorption by extraction, and from the solvent effecting this extraction usually by distillation, the solvent being of relatively low boiling range as compared to the coloring matter of boiling range corresponding to that of the lubricating oil.

The recovery of the color solvents for re-use, however, cannot economically be effected simply by redistillation of the solvent-extract mixture from the extraction step. For example, the decolorizing agent retains part of the color solvent following the extraction which must be separated from the decolorizing agent to make this part of the decolorizing agent available for re-use. This can be effected by washing the decolorizing agent, at this stage in the over-all operation, with an appropriate solvent for the color solvent, but this in turn requires recovery of the color solvent dissolved in such wash solvent. The cost of such wash solvent, and of its handling, is thus also involved in the economy of the over-all operation.

This invention provides a combined operation which accomplishes the recovery of the color solvent used in the extraction of contaminating coloring matter from the decolorizing agent, the color solvent being recovered in a form immediately available for re-use, with good efficiency and good economy with respect to the over-all operation.

According to this invention, the lubricating oil or lubricating oil mixture, after treatment with the solid decolorizing agent, is separated therefrom in a filter, oil retained by the decolorizing agent is displaced therefrom by washing it in the filter with naphtha, contaminating coloring matter is then extracted from the decolorizing agent in the filter with the color solvent, the color solvent retained by the decolorizing agent is displaced by washing the decolorizing agent in the filter with kerosene, kerosene retained by the decolorizing agent is then displaced by washing the decolorizing agent in the filter with naphtha and the naphtha retained by the decolorizing agent is then stripped therefrom by passing an inert gas through the decolorizing agent in the filter, the solvent and the kerosene-solvent mixture from the washing step following the extraction is collected and the color solvent is recovered therefrom by distillation, the naphtha-kerosene mixture from the washing step following the kerosene washing step is collected and the naphtha and kerosene are separately recovered therefrom by distillation, and the regenerated decolorizing agent is taken from the filter. After stripping retained naphtha from the decolorizing agent, following the extraction step and the subsequent washing steps, the decolorizing agent may be steamed and dried in the filter, partly in the filter and partly after removal from the filter, or after removal from the filter.

The naphtha used in carrying out the invention may be any appropriate petroleum fraction of boiling range sufficiently limited, as a maximum, to permit the subsequent stripping of this naphtha conveniently and economically. In general, a petroleum naphtha of boiling range approximating 200°–300° F. is used with advantage and such fractions may be taken as representative of naphtha useful in the process of the invention. The kerosene used in carrying out the invention may be any appropriate petroleum fraction of boiling range intermediate the naphtha used, and particularly any naphtha used as part of a composite color solvent mixture, and the lubricating oil processed, that is of boiling range appropriate to permit separation by fractional distillation from the naphtha used and for some purpose from extracted coloring matter. In general, a petroleum kerosene of boiling range approximating 350°–550° F. is used with advantage and such fractions may be taken as representative of kerosene useful in the process of the invention. When the color solvent is recovered from a kerosene-solvent mixture following the extraction, the separated coloring matter is discharged in solution in the kerosene or in a higher boiling part of the kerosene. Such kerosene fraction including the dissolved coloring matter may be supplied, for example, to a cracking operation without requiring separation of the dissolved coloring matter. However, if it is desirable or necessary to separate the kerosene from the coloring matter extracted from the decolorizing agent, gas oil is with advantage added to the kerosene-solvent mixture and the color solvent and the kerosene are separately recovered from this composite mixture by fractional distillation, the coloring material remaining in solution in the gas oil. The gas oil used in this embodiment of the invention may be of any appropriate petroleum fraction of boiling range appropriate to permit separation by fractional distillation from the kerosene used.

The invention is useful generally in connection with color solvents of relatively low boiling range, including water-miscible solvents and water-immiscible solvents. Acetone, methyl ethyl ketone, isopropyl ether and ethylene dichloride are examples of appropriate solvents. These and similar color solvents may be used as such or in the form of composite color solvent mixtures with, for example, from 15% to 85% (by volume) of naphtha. When the color solvent is used in the form of a composite solvent mixture, the fractional distillation for recovery of the color solvent from the kerosene solvent mixture, or kerosene-gas oil-solvent mixture, is with advantage controlled to produce this same composite mixture as one fraction to make it directly available for re-use. An amount of the color solvent or color solvent mixture equal to about one-half the volume of the lubricating oil contacted with the decolorizing agent in the filter is usually sufficient to effect the extraction of the coloring matter contaminating the decolorizing agent, the color solvent or color solvent mixture being flowed through the decolorizing clay in the filter at a rate sufficient to permit the necessary time of contact. The kerosene wash with which the color solvent or color solvent mixture is displaced from the decolorizing agent in the filter is continued until the kerosene leaving the filter is substantially free from the color solvent used.

The invention will be further described in connection with the accompanying drawing, a flow diagram illustrating the combined operation of the invention.

A lubricating oil mixture including the decolorizing agent and diluted with naphtha is pumped through the filter press to separate, in the filter, the decolorizing agent and to produce a blend of lubricating oil and naphtha free from the decolorizing agent. When the filter is fully charged with the separated decolorizing agent, the supply of the lubricating oil mixture to the filter is cut off, care being taken, however, to maintain pressure on the filter. At this point the decolorizing agent is washed in the filter with naphtha until it is substantially free from lubricating oil, the blend of lubricating oil and naphtha thus formed being added to the blend of lubricating oil and naphtha previously produced. The decolorizing agent in the filter is then free from lubricating oil and saturated with naphtha. Extraction of contaminating coloring matter may then be initiated without removing this naphtha from the decolorizing agent in the filter, but it is usually more advantageous first to strip this naphtha from the decolorizing agent as it otherwise dilutes the color solvent and increases the burden on the distillation recovery operation. This naphtha may be stripped from the decolorizing agent in the filter, for example, by passing an inert gas, steam, flue gas or air, through the decolorizing agent in the filter. Contaminating coloring matter is then extracted from the decolorizing agent in the filter with the color solvent or color solvent mixture. When the extraction of contaminating coloring matter is complete, the color solvent or color solvent mixture then saturating the decolorizing agent in the filter is displaced by washing the filter with kerosene. The color solvent or color solvent mixture from the extraction and the kerosene mixture from the subsequent washing step are subjected to a special fractionation to separate and recover the color solvent or color solvent mixture and the kerosene. The color solvent or color solvent mixture may thus be separated from the kerosene without separating the kerosene from the extracted coloring matter and this kerosene including the extracted coloring matter supplied, as a residuum from this special fractionation, to a cracking operation for example. Or, gas oil may be added to the mixture supplied to this special fractionation to leave as a residuum gas oil including the extracted coloring matter, and the color solvent or color solvent mixture and the kerosene separated from the coloring matter and from each other in this special fractionation. Following the kerosene wash, the kerosene then saturating the decolorizing agent in the filter is displaced by washing it in the filter with naphtha. The resulting naphtha-kerosene mixture is supplied to any conventional fractionation to separate and recover the naphtha and the kerosene. This separation of naphtha and kerosene from this naphtha-kerosene mixture may, for example, be effected by supplying this mixture as part of the raw charging stock to some distillation operation in which fractions of the same boiling range are being separated from a raw stock of boiling range including that of the mixture. The naphtha with which the decolorizing agent in the filter remains saturated after the final naphtha wash is then stripped from the decolorizing agent by passing an inert gas, steam, flue gas or air, therethrough. The regenerated decolorizing agent is then removed from the filter.

While it is advantageous to carry out the several regeneration steps previously described in the filter, it is also possible to remove the decolorizing agent from the filter after freeing it from lubricating oil, and either before or after stripping it of naphtha retained following the naphtha wash to eliminate lubricating oil, and to carry out the succeeding operations described in separate vessels. For example, the decolorizing agent with adsorbed coloring matter may be removed from the filter and transferred to a tank with appropriate means for agitation and heating. This tank may be large enough to accommodate several charges of contaminated decolorizing agent from the filter. The extraction with the color solvent or color solvent mixture may then be effected in this tank and the resulting mixture including color solvent and decolorizing agent then pumped through a separate filter press in which the subsequent kerosene wash and naphtha wash may be effected.

We claim:

1. In the solvent regeneration of solid decolorizing agents contacted with petroleum lubricating oils to decolorize such oils, the improvement which comprises separating the oil from the decolorizing agent in a filter, displacing retained oil from the decolorizing agent by washing it in the filter with naphtha, thereafter extracting contaminating coloring matter from the decolorizing agent in the filter with a color solvent, displacing color solvent retained by the decolorizing agent by washing it in the filter with kerosene and then displacing kerosene retained by the decolorizing agent by washing it in the filter with naphtha, collecting the solvent and kerosene-solvent mixture and recovering the solvent therefrom by distillation, collecting the naphtha-kerosene mixture and recovering the naphtha and kerosene therefrom by distillation, stripping retained naphtha from the extracted decolorizing agent by passing an inert gas therethrough in the filter and removing the regenerated decolorizing agent from the filter.

2. In the solvent regeneration of solid decolorizing agents contacted with petroleum lubricating oils to decolorize such oils, the improvement which comprises separating the oil from the decolorizing agent in a filter, displacing retained oil from the decolorizing agent by washing it in the filter with naphtha, thereafter extracting contaminating coloring matter from the decolorizing agent in the filter with a color solvent, displacing color solvent retained by the decolorizing agent by washing it in the filter with kerosene and then displacing kerosene retained by the decolorizing agent by washing it in the filter with naphtha, collecting the solvent and kerosene-solvent mixture, adding gas oil thereto and recovering kerosene and the solvent from the composite mixture by distillation, collecting the naphtha-kerosene mixture and recovering the naphtha and kerosene therefrom by distillation, stripping retained naphtha from the extracted decolorizing agent by passing an inert gas therethrough in the filter and removing the regenerated decolorizing agent from the filter.

3. In the solvent regeneration of solid decolorizing agents contacted with petroleum lubricating oils to decolorize such oils, the improvement which comprises separating the oil from the decolorizing agent in a filter, displacing retained oil from the decolorizing agent by washing it in the filter with naphtha, thereafter extracting contaminating coloring matter from the decolorizing agent with a color solvent, displacing color solvent retained by the decolorizing agent by washing it with kerosene and then displacing kerosene retained by the decolorizing agent by washing it with naphtha, collecting the solvent and kerosene-solvent mixture and recovering the solvent therefrom by distillation, collecting the naphtha-kerosene mixture and recovering the naphtha and kerosene therefrom by distillation, stripping retained naphtha from the extracted decolorizing agent by passing an inert gas therethrough and collecting the regenerated decolorizing agent.

4. In the solvent regeneration of solid decolorizing agents contacted with petroleum lubricating oils to decolorize such oils, the improvement which comprises separating the oil from the decolorizing agent in a filter, displacing retained oil from the decolorizing agent by washing it in the filter with naphtha, stripping retained naphtha from the decolorizing agent by passing an inert gas therethrough in the filter, thereafter extracting contaminating coloring matter from the decolorizing agent in the filter with a color solvent, displacing color solvent retained by the decolorizing agent by washing it in the filter with kerosene and then displacing kerosene retained by the decolorizing agent by washing it in the filter with naphtha, collecting the solvent and kerosene-solvent mixture and recovering the solvent therefrom by distillation, collecting the naphtha-kerosene mixture and recovering the naphtha and kerosene therefrom by distillation, stripping retained naphtha from the extracted decolorizing agent by passing an inert gas therethrough in the filter and removing the regenerated decolorizing agent from the filter.

5. In the solvent regeneration of solid decolorizing agents contacted with petroleum lubricating oils to decolorize such oils, the improvement which comprises separating the oil from the decolorizing agent in a filter, displacing retained oil from the decolorizing agent by washing it in the filter with naphtha, stripping retained naphtha from the decolorizing agent by passing an inert gas therethrough in the filter, thereafter extracting contaminating coloring matter from the decolorizing agent with a color solvent, displacing color solvent retained by the decolorizing agent by washing it with kerosene and then displacing kerosene retained by the decolorizing agent by washing it with naphtha, collecting the solvent and kerosene-solvent mixture and recovering the solvent therefrom by distillation, collecting the naphtha-kerosene mixture and recovering the naphtha and kerosene therefrom by distillation, stripping retained naphtha from the extracted decolorizing agent by passing an inert gas therethrough and collecting the regenerated decolorizing agent.

6. In the solvent regeneration of solid decolorizing agents contacted with petroleum lubricating oils to decolorize such oils, the improvement which comprises separating the oil from the decolorizing agent, displacing retained oil from the decolorizing agent by washing it with naphtha, thereafter extracting contaminating coloring matter from the decolorizing agent with a color solvent, displacing color solvent retained by the decolorizing agent by washing it with kerosene and then displacing kerosene retained by the decolorizing agent by washing it with naphtha, collecting the solvent and kerosene-solvent mixture and recovering the solvent therefrom by distillation, and stripping retained naphtha from the extracted decolorizing agent by passing an inert gas therethrough.

ALBERT E. MILLER.
GEORGE R. LORD.